Sept. 24, 1963  J. D. CLARK  3,104,511
MOWER HAVING RECIPROCATING COUNTERBALANCED ELEMENTS
Filed April 16, 1962  2 Sheets-Sheet 1
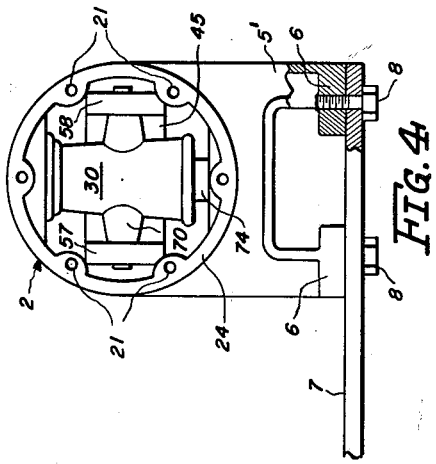
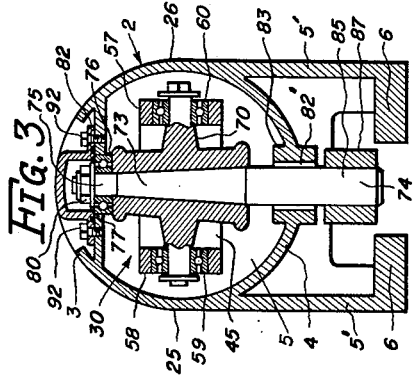
INVENTOR
John D. Clark
Paul O. Pippel
ATTORNEY

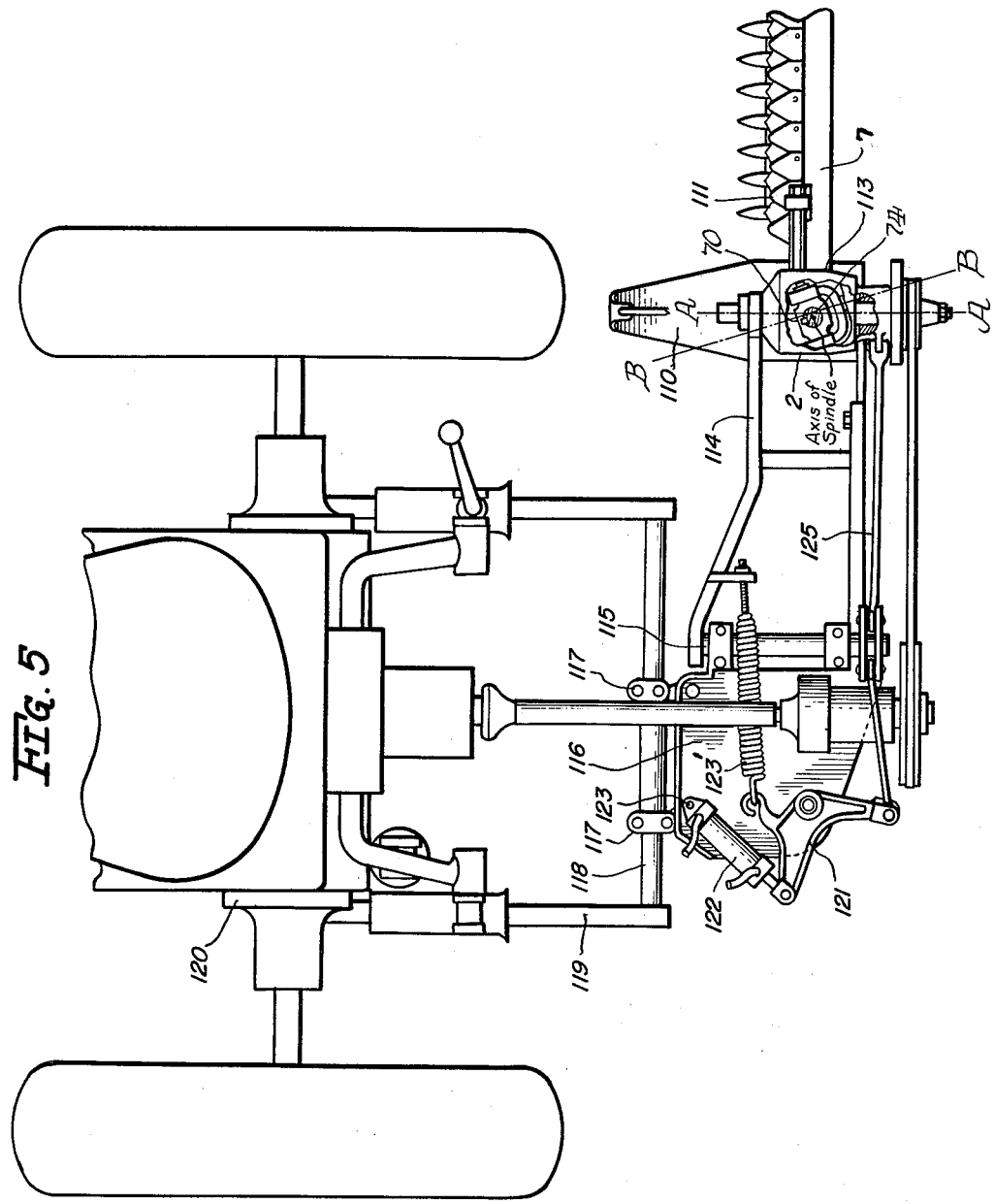

United States Patent Office 3,104,511
Patented Sept. 24, 1963

3,104,511
MOWER HAVING RECIPROCATING COUNTER-BALANCED ELEMENTS
John D. Clark, South Bend, Ind., assignor to International Harvester Company, Chicago, Ill., a corporation of New Jersey
Filed Apr. 16, 1962, Ser. No. 190,192
11 Claims. (Cl. 56—296)

This invention relates to mowers and more particularly to a novel counterbalanced mower unit and is a continuation-in-part of my U.S. application Serial No. 798,434, filed March 10, 1959, for Gyration Mower Drive, now abandoned.

A general object of the invention is to provide a novel and improved drive for a mower wherein certain inaccuracies which are inherent in mass production are tolerable.

A more particular object of the invention is to provide a novel wobble drive for a mower wherein the wobble driving mechanism is so arranged that the main wobble crank is simplified and drive an oscillating yoke through a misalignment-accommodating bearing assembly, the yoke driving a cross head of a vertical drive member which oscillates back and forth and driving a counterweighted arm which, in turn, is connected to the sickle of the reciprocating mower.

A still further object of the invention is to provide a novel simplified mower drive which utilizes simple parts which are arranged in an effective manner to obtain an efficient drive and which are readily and easily assembled and dismantled.

A more particular object of the invention is to provide a novel drive which comprises a generally horizontal input shaft provided at its inner end with a wobble drive portion enclosed within a supporting housing, the wobble drive portion being dynamically counterbalanced and driving a yoke which embraces a cross head on a vertical output member which is rotatably supported adjacent to its upper an lower end, the lower end of the output member being connected to a reciprocating arm which in turn is connected to the sickle bar.

These and other objects of the invention will become more apparent from the specification and the drawings, wherein:

FIGURE 1 is a vertical sectional view of the novel drive mechanism taken substantially on the line 1—1 of FIGURE 2;

FIGURE 2 is a horizontal transverse section taken substantially on the line 2—2 of FIGURE 1 with the input shaft partially rotated;

FIGURE 3 is a transverse vertical sectional view taken substantially on the line 3—3 of FIGURE 2;

FIGURE 4 is a side elevational view of the housing structure with the front cover plate removed; and FIGURE 5 is a plan view of the novel mower partly in section.

Describing the invention in detail and having particular reference to the drawings there is shown a housing or support generally designated 2 which has arcuate top and bottom walls 3 and 4 and rear wall 5, the bottom wall 4 having a dependent supporting structure 5' in the form of pedestals 6, 6 to which is attached support or mower bar 7 of a cutter as by bolts 8, 8.

The rear wall 5 is provided with a rearwardly projecting embossment or stud structure 10 which provides a journal via a bearing structure 11 mounted thereon for an arm 12 of the mower frame generally designated 13, the mower frame 13 also having a forward arm 15 which journals as at 16 on the pin 17 which is suitably secured as by the locking bolt 18 within the socket 19 formed centrally within the front cover plate 20 which is provided with a series of peripheral apertures 21 through which are passed bolts 22 which thread as at 23 into the forward marginal portions 24 of the top and bottom walls 3 and 4 as well as the side walls 25 and 26 of the housing which extend therebetween and project forwardly from the rear wall 5 to provide a hollow housing enclosure 28 for the mower drive mechanism generally designated 30.

The mower drive mechanism or means 30 includes an input shaft 31 which extends through a central bore 32 in the boss structure 10 on the rear wall and is journaled therein by a pair of bearings 33 and 34 at opposite sides of a lubricant reservoir 35 which is shown as an enlargement of the bore 32 intermediate the ends of the embossment 10. The outer end 36 of the input shaft 31 is keyed to a driving pulley 38 which is suitably driven by a belt through any suitable gear train, for example, the power take-off of the tractor.

The liner end of the shaft 31 is provided with a wobble member 40 which extends angularly to the axis of the shaft 31 and is provided with a forwardly open socket 41 within which is mounted a bearing 42 preferably of the ball type which accommodates some misalignment while effecting a drive of the spindle or throw 44 of the yoke structure 45, said spindle having a shoulder 46 abutting against the outer edge of the inner race of the bearing structure 42 and the inner edge of the race 47 being engaged by a nut 48 which is threaded on the inner end 49 of the spindle 44. The structure 45 and member 40 are to be considered as the wobble means. The outer race 50 of the bearing 42 is held captive in the socket between the shoulder 51 and the retaining ring 52 which is bolted as at 53 to the member 40 about the edges of the socket. It will be seen that the assembly which is mounted within the wobble member 40 as well as the mass of the member 40 is counterbalanced by a counterbalancing weight 56 and that during rotation of the shaft 31 with the wobble 40 counterweight 56 counterbalances the moments developed by the change in the directions of the movement of the various parts.

The weight 56 is arranged to pass around portions of the bifurcated yoke portion or wobble throw which comprises the legs 57 and 58 and the legs or arms 57, 58 being journaled as at 59 and 60 on opposite ends of a cross head 70 which at its center portion 71 is keyed as at 72 to the upper portion 73 of a substantially vertical output member or shaft generally designated 74.

It will be seen that the upper end 75 of the member 74 is journaled by a bearing 76 within an opening 77 in a depressed part 78 of the upper wall 3 of the housing and that the upper portion 75 of the spindle projects upwardly beyond the depressed part 78 and is provided with a nut 80 which is threaded on the upper end of said shaft 74, shaft nut 80 being capped by a cap member 81 which encloses the member 80 and compresses a sealing ring 82 against the portion 78.

The spindle 74 is journaled intermediate its ends as by a self-sealing bearing 82' which is suitably mounted in a socket 83 which is formed integral with the bottom wall 4, the lower end portion 85 of said spindle 74 depending below the lower wall and being keyed as at 86 to an arm or drive transmitting means 87 intermediate the ends thereof, the rear portion 88 of the arm 87 being provided with a counterweight 89 and the forward portion 90 being provided with an associated connecting pin 91 for connection to a portion of the reciprocating knife in a manner such as shown in U.S. Patent No. 2,824,416.

It will be seen that in assembling the structure that the upper cap 81 is removed by unscrewing the bolts 92 and then the nut 80 is removed whereupon the entire spindle 74 is driven out downwardly so as to remove it from the housing and the hub 71 of the cross arm. Thereafter the entire assembly, that is shaft 31, together with all of the structure connected thereto including the yoke are removed from the housing after the nut 94 and the pulley wheel 38 are removed from the rear end of the shaft 31.

Of course, prior to such removal, the arms 13 and 15 are initially removed as well as the sheave or pulley 38 and, of course, the bolts 22 are removed so that the entire assembly is accessible from the forward open end of the housing. It will be understood that prior to any disassembly, that the bolts 8, 8 are also removed to disassociate the housing from the mower bar structure.

In assembly the parts are inserted in reverse order and that is the shaft 31 is passed through the bearings 33 and 34 which have been mounted in the boss 10 whereupon the yoke assembly is in position within the housing. Then this sub-assembly is rotated to admit the shaft 73 through the bearing 82' and the hub portion 71 and entered into the bearing 76 whereupon the nut 80 is applied and the cap 81 is then placed over the upper end of the shaft 73 against the gasket 82 whereupon the bolts 92 are drawn up. It will be understood that shaft 73 and arm 87 are assembled prior to the assembly with the wobble drive. Then the front cap 20 is mounted on the forward part of the housing and secured by the bolts 22.

The journal portion 10 contains an enlarged lubricant cavity 35 intermediate its ends communicating with the bore and the upper portion 96 of cavity 35 communicates with the lower discharge extremity 97 of a diagonal passage 98 extending upwardly to the upper end 99 of the enclosure 28 which contains lubricant 100 into which the wobble and counterweight dip and sling the oil against the upper part 101 of rear wall 5 above the lip 102 below the inlet end of passage 98 into which the lubricant drains.

In the detailed presentation of FIGURE 5 it will be observed that the misalignment between the axis of the wobbler throw 44 and the axis of the yoke spindle 70 is shown by the lines A—A and B—B in order to bring out the novel interaction of the universal connection between the throw 44 and the spindle 31 and the wobble member 40. It will be readily observed that the amplitude and rate of oscillatory movement of the yoke spindle 70 will not be uniform and depend upon the extent of deviation between the axes as aforesaid. Thus the movement of the counterweight 89 and the sickle is not uniform in each direction of movement. The rate of speed as well as the extent of movement vary in each direction of oscillation of the mower. This effect has a tendency to unbalance the system within narrow limits but is sufficient to engender controlled vibration in the mower which is effective to shake off the grasses accumulating on the mower bar. I have found that a perfectly balanced mower will quickly become plugged, and, therefore, the novel invention is effective to produce a controlled vibration which is sufficient to remove the grass off the mower bar but is not destructive of the equipment.

As best seen in FIGURE 5 the novel mower structure is carried from the inner shoe 110 and the arm 91 is connected to the sickle or cutter element 111 which reciprocates on the mower bar 7 suitably connected as by bolts 113 to the shoe or support structure 110. The housing 2 is pivoted on a substantially horizontal axis to the coupling structure 114 which is pivoted on a substantially horizontally fore and aft extending axis by a shaft 115 to the casting or mounting plate 116, the mounting plate 116 being adjustably connected as by clamps 117 to the cross bar 118 of the hitch structure 119, said hitch structure being suitably mounted from an ambulatory prime mover such as a tractor 120.

In the exemplary form shown, and not for purposes of limitations, the support plate 116 carries lever linkage 121 which is hydraulically actuated by the ram structure 122 which is anchored as at 123 to the plate and to the lever linkage 121, the linkage 121 incorporating a balancing means 123' for counterbalancing the mower structure and the coupling arm assembly through the pull rod assembly 125 which is connected between the lever 121 and the housing 2.

It will be understood that the foregoing description and embodiment has been chosen merely to illustrate the preferred form of the invention and it will be obvious to those skilled in the art that various other forms of the invention will be readily apparent within the scope of the appended claims.

What is claimed is:

1. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and an arm connected intermediate its ends to said output member and having a counterweight at one end and having means at its opposite end for connection to one end of one of the cutting elements, said arm being substantially straight and disposed in a plane substantially paralleling said cutting elements, and said counterweight and arm disposed beneath said housing.

2. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counter-balancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and said output member comprising a shaft connected intermediate its ends to said wobble throw and having upper and lower ends, means journaling said shaft at its upper end from the housing, means journaling said shaft adjacent to its lower end from the housing, said lower end of the shaft depending below the housing, said drive transmitting means comprising an arm extending substantially normal to said shaft, said connection of the arm to the cutter comprising a pin extending through one end of the arm substantially normal to said arm and generally parallel to the axis of said shaft, and a counterweight connected to the other end of the arm, said counterweight having a compact portion projecting from one side of the arm.

3. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and said drive transmitting means comprising an arm beneath the housing, a counterweight at one end of the arm beneath the housing, said means for connection to the cutter comprising a pin extending through one end of one of the elements and the other end of the arm substantially parallel to the axis of said vertical output member, and said counterweight having a swinging arc disposing the same in vertical alignment with said counterweight means in certain positions thereof.

4. The invention according to claim 3 and said arm in operating position of the cutter swinging in a generally horizontal plane and disposed below said axis of said wobble means and said counterweight having an arc of swing substantially equal to the horizontal distance of movement of the counterweight means.

5. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and said counterweight means swingable in an orbit about the axis of said wobble means, and said output member having a counterweight and being entirely below said counterweight means and said counterweight having a distance of movement substantially equal to the diameter of the orbit of movement of the counterweight means.

6. A reciprocating type cutter comprising a pair of cutting elements, a support, a housing having means thereon for mounting thereof on the support and to one end of one of the cutting elements, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis at one side of said preselected axis, and drive transmitting means operatively connected to the output member and having means for connection to the cutter and said means for mounting said housing on the support having a pivotal axis coincidental with the axis of said wobble means and said housing disposed at one end of the cutter and connected to one of the elements, and said drive transmitting means comprising an arm connected intermediate its ends to said vertical output member, a counterweight on one end of the arm remote from the cutter and said counterweight means rotatable about said axis of the wobble means in a plane transverse to the plane of the arc of movement of said counterweight.

7. The invention according to claim 6 and said counterweight having a mass displaced vertically from the medial plane of the arm.

8. A reciprocating type cutter comprising a pair of cutting elements, a support, a housing having means thereon for mounting thereof on the support and to one end of one of the cutting elements, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis at one side of said preselected axis, and drive transmitting means operatively connected to the output member and having means for connection to the cutter and said means for mounting said housing on the support having a pivotal axis coincidental with the axis of said wobble means and said housing disposed at one end of the cutter and connected to one of the elements, and said drive transmitting means comprising an arm connected intermediate its ends to said vertical output member, a counterweight on one end of the arm remote from the cutter and said counterweight means rotatable about said axis of the wobble means in a plane transverse to the plane of the arc of movement of said counterweight, said wobble means comprising an input shaft journaled in the housing, a pulley connected to said input shaft, said pulley providing an inertia driving mass.

9. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and said wobble means having a generally horizontal input shaft journalled on the housing transversely of said cutter, a belt driven pulley connected to the input shaft, a stub shaft mounted on the housing coaxially with the input shaft, and said mounting of the housing on the support being located about said input and stub shafts on a generally horizontal axis whereby said cutter is adapted to be operated in any position about said axis.

10. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and said housing having lubricant therein, said wobble means having an input shaft, bearing means journaling the input shaft on the housing, said housing having lubricant passage means to the bearing means, and said counterweight means having dipping relation to the lubricant and disposed in lubricant delivering relation to the bearing means via said passage means.

11. A reciprocating type cutter comprising a pair of cutting elements, a support, a housing having means thereon for mounting thereof on the support, wobble means rotatably mounted within said housing for rotation about a preselected axis, counterweight means operably associated with said wobble means in counterbalancing relationship thereto, a wobble throw having a spindle, means serving as a universal rotary mounting for the spindle to said wobble means in driven relationship thereby and for universal angling with respect thereto, and an oscillating vertical output member connected to said wobble throw and having an operational axis offset with respect to said preselected axis, and drive transmitting means operatively connected to the output member and having means for connection to the cutter, and one of said cutting elements having one end underposed with respect to the housing and directly connected thereto, said drive transmitting means comprising a generally straight arm disposed beneath the housing and connected intermediate its ends to the vertical output member and extending substantially normal thereto, a counterweight on one end of the arm, and a pivotal connection between the other end of the arm and one end of the other of said cutting elements, said arm directly overlying said cutting elements and having substantially equal lengths between the output member and said counterweight and between the output member and said pivotal connection with the other cutting element.

References Cited in the file of this patent

UNITED STATES PATENTS

| | | |
|---|---|---|
| 1,246,156 | Rae | Nov. 13, 1917 |
| 1,380,620 | Whitcomb | June 7, 1921 |
| 1,592,237 | Walker | July 13, 1926 |
| 2,824,416 | Orelind | Feb. 25, 1958 |

FOREIGN PATENTS

| | | |
|---|---|---|
| 827,441 | Germany | Jan. 10, 1952 |

OTHER REFERENCES

"Power vs. Drudgery," published by Gravely Motor Plow and Cultivator Co., of Dunbar, West Virginia, March 1952. (Pages 8, 9, 22, and 23 relied on.)

"Instruction Manual, Illustrated Parts and Price List for the Model L. Gravely Tractor and Attachments," published by Gravely Motor Plow and Cultivator Co., of Dunbar, West Virginia, July 1952. (Pages 15, 16, and 17 relied on.)